(12) United States Patent
Miyahara

(10) Patent No.: US 6,404,466 B1
(45) Date of Patent: Jun. 11, 2002

(54) THIN FILM TRANSISTOR ARRAY FOR LIQUID CRYSTAL DISPLAY (LCD) APPARATUS

(75) Inventor: Tae Miyahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,630

(22) Filed: Apr. 21, 2000

(30) Foreign Application Priority Data

Apr. 27, 1999 (JP) .............................. 11-120592

(51) Int. Cl.⁷ .............................. G02I 1/1333
(52) U.S. Cl. .............................. 349/48
(58) Field of Search ................ 349/48; 345/93

(56) References Cited

U.S. PATENT DOCUMENTS 5,946,060 A * 8/1999 Nishiki et al. ................ 349/48

* cited by examiner

Primary Examiner—James Dudek
(74) Attorney, Agent, or Firm—Sughrue Mion, PLLC

(57) ABSTRACT

A thin film transistor array for improving writing characteristics into a pixel electrode without a decrease in aperture ratio is provided. A source electrode of a thin film transistor for writing and a source electrode of a thin film transistor for preliminary charging are electrically connected to a pixel electrode. A semiconductor pattern of the thin film transistor for preliminary charging is formed so as to cover a region of intersection of a scanning line 1a and a signal line and a part of a region of formation of a gate storage capacitance.

18 Claims, 11 Drawing Sheets

THIN FILM TRANSISTOR ARRAY FOR LIQUID CRYSTAL DISPLAY (LCD) APPARATUS

BACKGROUND OF THE INVENTION

The present invention relates to a TFT (Thin Film Transistor) array constituting a liquid crystal display (LCD) apparatus and so on.

An active matrix LCD (AM-LCD) using a TFT array in a switching device of a pixel electrode has been well known. This TFT array is configured by arranging plural scanning lines and signal lines so as to intersect at right angles on an insulating substrate and arranging pixel electrodes in the regions surrounded by the scanning lines and the signal lines and providing a TFT (hereinafter called "first TFT") for supplying a signal voltage to each pixel electrode. The TFT has a source electrode, a drain electrode, a gate electrode, an active layer, and a gate insulating film. The source electrode is connected to one of the pixel electrodes, and the drain electrode is connected to one of the signal lines, and the gate electrode is connected to one of the scanning lines. When the TFT is selected by a signal from the scanning lines, the TFT conducts and the signal voltage is supplied to the pixel electrodes through the signal lines.

Next, a conventional AM-LCD will be described with reference to the accompanying drawings. FIG. 1 is a plan view showing a configuration of the conventional AM-LCD. As shown in FIG. 1, this AM-LCD is provided with a second TFT 200 for preliminary charging for performing preliminary charging of a pixel electrode 3 other than a first TFT 100 for writing disposed to drive the pixel electrode 3. This second TFT 200 is formed at a diagonal position to the first TFT 100 within a display region. A second gate electrode 21 of the second TFT 200 is connected to a scanning line 1*a* of the forward row of a scanning line 1*b* connected to a first gate electrode 11 of the first TFT 100. A second drain electrode 22 of the second TFT 200 is electrically connected to a signal line 2*b* of the next column of a signal line 2*a* electrically connected to a first drain electrode 12 of the first TFT 100. Further, a second source electrode 23 of the second TFT 200 is connected to the pixel electrode 3 in a manner similar to a first source electrode 13 of the first TFT 100.

By forming the second TFT 200 in the vicinity of an intersection of the scanning line 1*a* and the signal line 2*b* in this manner, even in case that the first TFT 100 is defected, the second TFT 200 instead of the first TFT 100 can supply a signal voltage to the pixel electrode.

Then, a circuit of the TFT array will be described with reference to FIG. 2. As shown in FIG. 2, in the conventional TFT array, a plurality of scanning lines 1*a*, 1*b* and 1*c* are arranged in parallel and a plurality of signal lines 2*a*, 2*b* and 2*c* are arranged perpendicular to these scanning lines. One pixel electrode 3 is arranged in each of a plurality of regions configured by these scanning lines and signal lines.

As a switching device for driving the pixel electrode, a first TFT 100 is formed in the vicinity of an intersection of the scanning line 1*b* and the signal line 2*a*, and a first drain electrode 12 of the first TFT 100 for writing is electrically connected to the signal line 2*a*.

Further, a gate electrode 11 of the first TFT 100 is connected to the scanning line 1*a* and a first source electrode 13 of the first TFT 100 is connected to the pixel electrode 3.

However, there was the following problem in the conventional TFT array. The TFT array described above can control occurrence of a point defect etc. by providing two TFTs for driving the pixel electrode.

But, a problem that a decrease in open aperture ratio cannot be ignored in comparison with a TFT array in which only one TFT is arranged in one pixel essentially has occurred. Here, the aperture ratio means a ratio of an area of a portion capable of light modulation to the total area of a pixel. Recently, a decrease in power consumption of the LCD has been desired. For that purpose, it is effective to increase the aperture ratio of the LCD to obtain enough intensity of light. That is, a decrease in aperture ratio has been caused by arranging the two TFTs in an pixel region as a switching device of the pixel electrode.

SUMMARY OF THE INVENTION

An object of the present invention is to provide a TFT array for improving writing characteristics into a pixel electrode without a decrease in aperture ratio in order to solve the problem in the conventional art described above.

In order to solve the above problem, a first invention of the present application is characterized in that at least a second TFT for preliminary charging is configured so as to overlap with a part of a region of intersection of a scanning line and a signal line.

By such a configuration, a decrease in aperture ratio of the TFT array can be prevented and as a result, power consumption of a LCD can be decreased.

A second invention of the present application is characterized in that the second TFT for preliminary charging is configured so as to cover a part of a region of forming the signal line.

By such a configuration, even in case that a first TFT 100 is defected, a pixel electrode 3 can be normally driven using a second TFT 200 instead of the first TFT 100, and simultaneously the aperture ratio can be improved.

A TFT array of a third invention of the present application provided to solve the above problem is characterized in that the second TFT for preliminary charging is formed on a scanning line of the forward row of a scanning line connected to a gate electrode of a first TFT for writing.

By such a configuration, a size of the first TFT for writing can be reduced as well as the prevention of a decrease in aperture ratio.

A TFT array of a fourth invention of the present application is characterized in that contact holes extending through a passivation layer are formed on a source electrode of the first TFT for writing and a source electrode of the second TFT for preliminary charging and the two source electrodes are electrically connected to the pixel electrode.

By such a configuration, when forming the TFT array, a formation step of the passivation layer can be eliminated and as a result, yields can be improved and the production costs can be reduced.

DETAILED DESCRIPTION OF THE INVENTION (First Embodiment)

Figure 1:
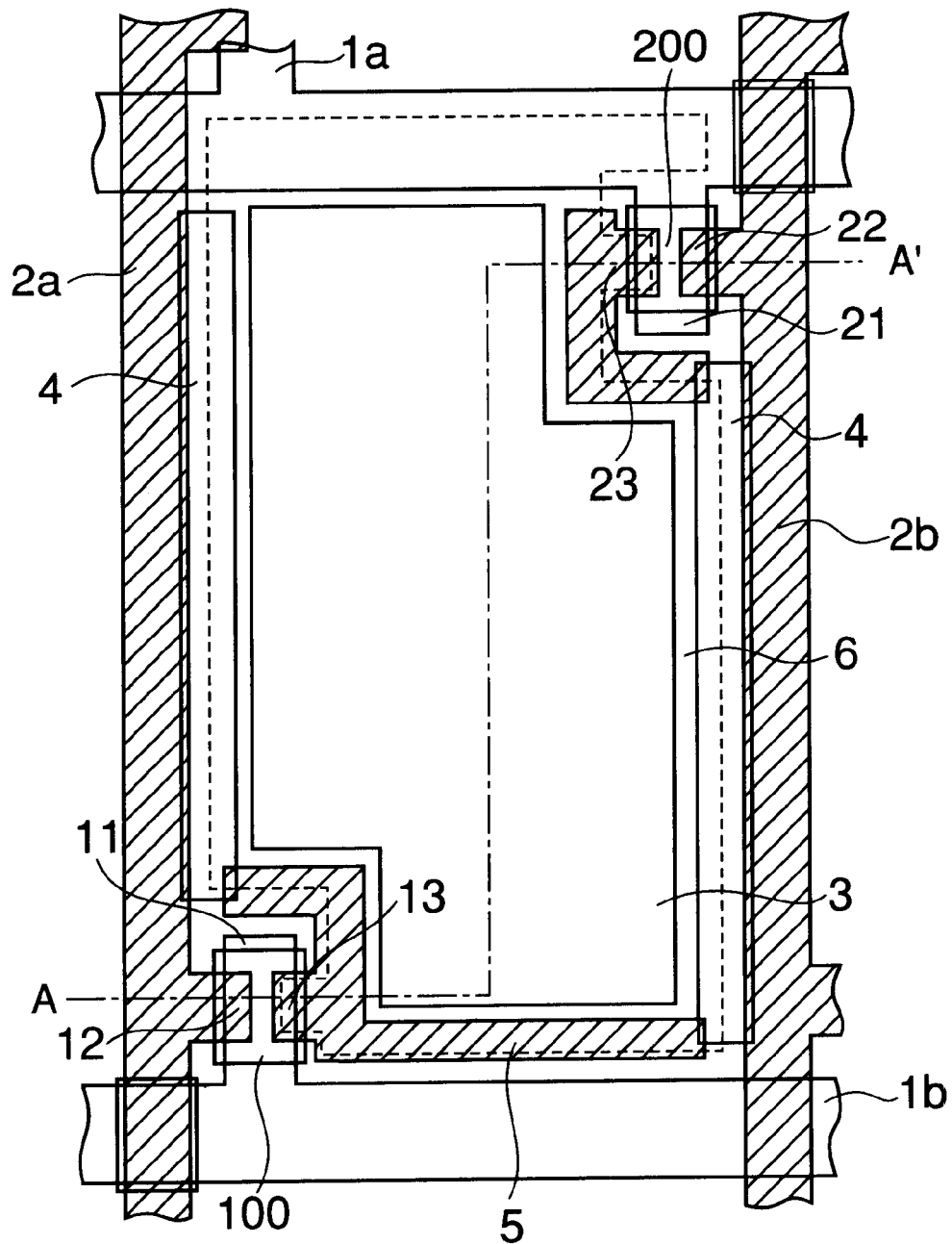
FIG. 1 is a plan view showing a configuration of a conventional TFT array.
Figure 2:
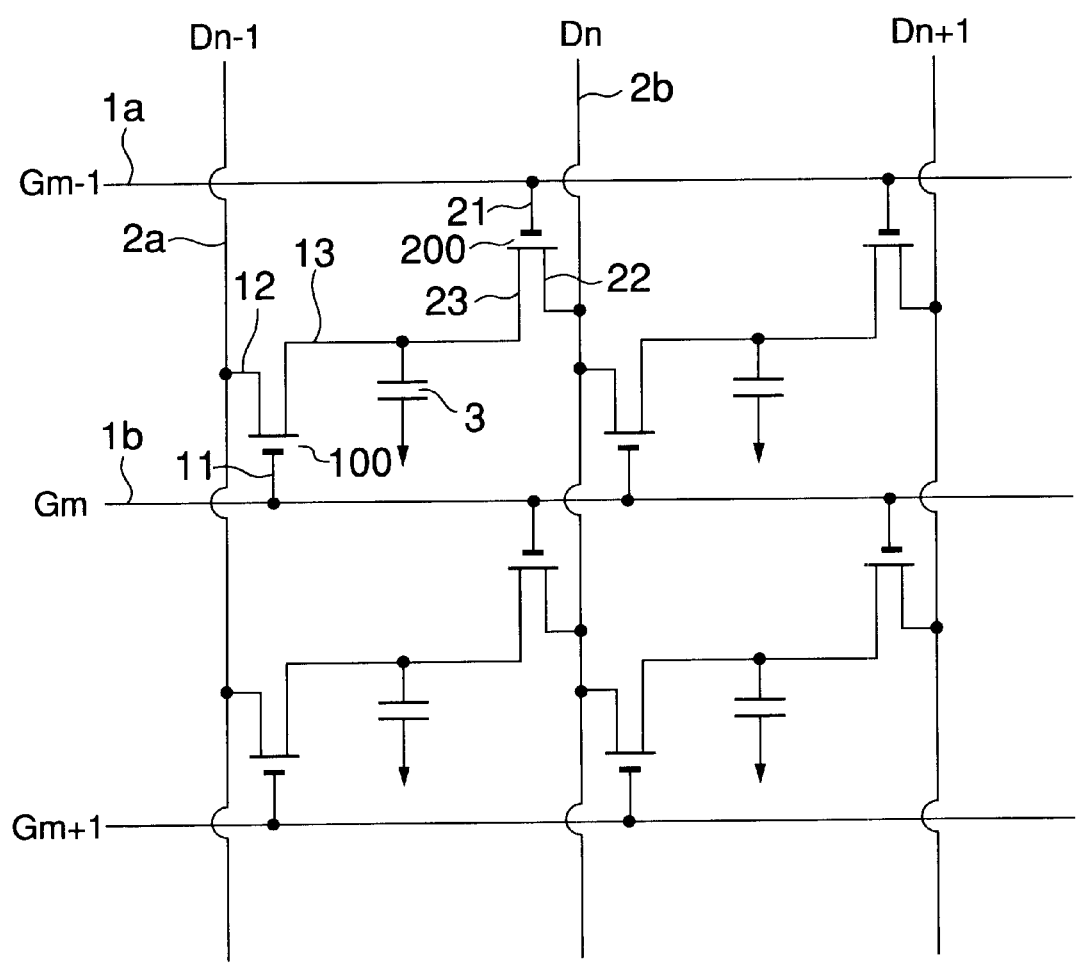
FIG. 2 is a block diagram showing a circuit configuration of the conventional TFT array.
Figure 3:
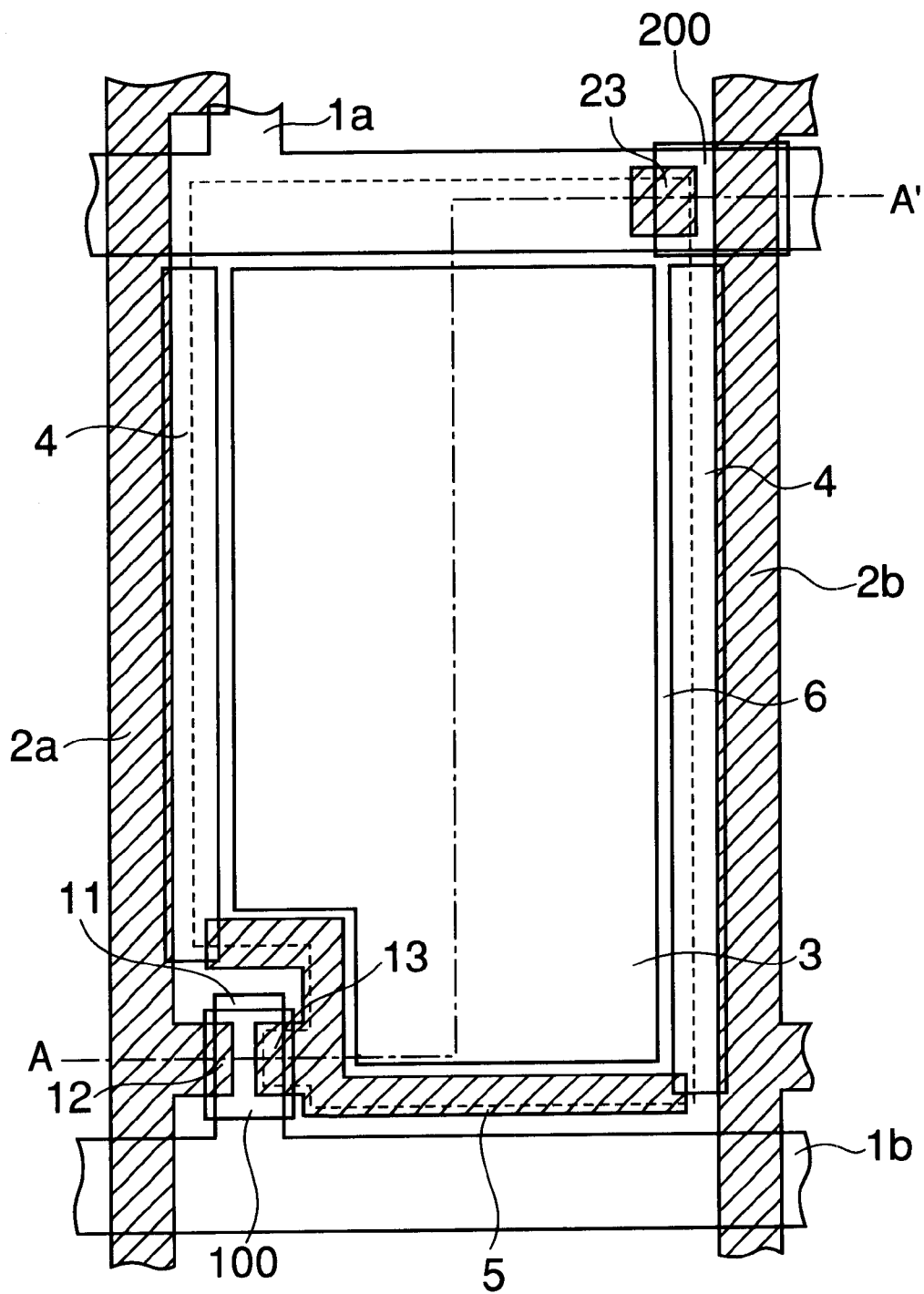
FIG. 3 is a plan view showing a first embodiment of a TFT array of the present invention.

A first embodiment of a TFT array of the present invention will be described below. As shown in FIG. 3, in the TFT array of the present invention, a plurality of scanning lines 1a and 1b are arranged in parallel. A plurality of signal lines 2a and 2b are arranged perpendicular to these scanning lines 1a and 1b.

One pixel electrode 3 is arranged in each of pixel regions surrounded by these scanning lines 1a, 1b and signal lines 2a, 2b.

As a switching device for supplying a signal voltage to each pixel electrode 3, a first TFT 100 is formed in the vicinity of a point at which the scanning line and the signal line intersect at right angles, for example, a region of intersection of the scanning line 1b and the signal line 2a. A second TFT 200 for preliminary charging is formed so as to cover a part of a region of intersection of the scanning line 1a and the signal line 2b. This second TFT 200 has a function of performing preliminary charging to the pixel electrode 3 when a voltage is supplied to the pixel electrode 3. Here, a description of a circuit configuration showing an electrical connection of the first TFT 100 and the second TFT 200 to each of the scanning lines, the signal lines and the pixel electrodes is omitted since the description is similar to that of the conventional TFT array.

In the first embodiment of the TFT array of the present invention, first light shield layers 4 are formed so as to be sandwiched between the pixel electrode 3 and the signal lines 2a, 2b, respectively. A second conductive light shield layer 5 is formed so as to be sandwiched between the pixel electrode 3 and the scanning line 1b.

This second light shield layer 5 is integrally formed with a first source electrode 13 of the first TFT 100 and is electrically connected to the pixel electrode 3.

Figure 4:
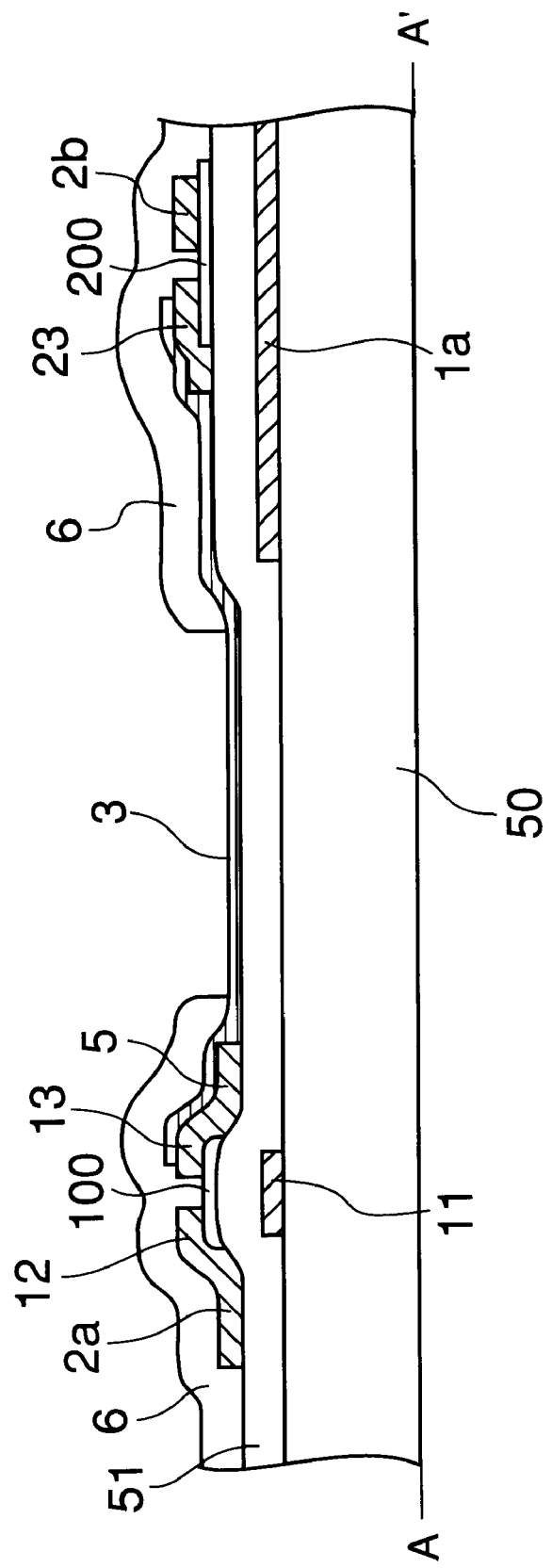
FIG. 4 is a sectional view showing a structure in the first embodiment of the TFT array of the present invention.

A sectional view taken on line A—A' of FIG. 3 is shown in FIG. 4. As shown in FIG. 4, in the TFT array of the present invention, a first gate electrode 11 of the first TFT 100 for writing, the scanning line 1a, and a gate insulating film 51 are formed on a transparent insulating substrate 50 to electrically insulate the first gate electrode 11, a first active layer 14 and the scanning line 1a. A first drain electrode 12 of the first TFT 100 is formed and the signal line 2a is integrally formed with this first drain electrode 12. The second light shield layer 5 is formed so as to cover a part of a region between the pixel electrode 3 and the scanning line 1b. A first source electrode 13 of the first TFT 100 is integrally formed with this second light shield layer 5.

The second TFT 200 for preliminary charging is formed over the scanning line 1a through the gate insulating film 51. A second source electrode 23 of the second TFT 200 and a second active layer 24 are formed over the scanning line 1a, and the signal line 2b is formed distant from the second source electrode 23. The pixel electrode 3 is formed so as to cover the first source electrode 13 of the first TFT 100, the second light shield layer 5, the gate insulating film 51 and the second source electrode 23 of the second TFT 200. A passivation layer 6 is formed so as to cover the gate insulating film 51 formed on the first gate electrode 11 of the first TFT 100, the signal line 2a, the first drain electrode 12 of the first TFT 100, the first source electrode 13 and the periphery of the pixel electrode 3. The passivation layer 6 is formed over the scanning line 1a so as to cover the gate insulating film 51, the signal line 2b, the second active layer 24, the second source electrode 23 and the periphery of the pixel electrode 3.

By arranging the second TFT 200 for preliminary charging so as to cover a part of a region of intersection of the scanning line and the signal line in this manner, a decrease in aperture ratio of the TFT array is prevented, with the result that power consumption can be reduced.

Figure 5:
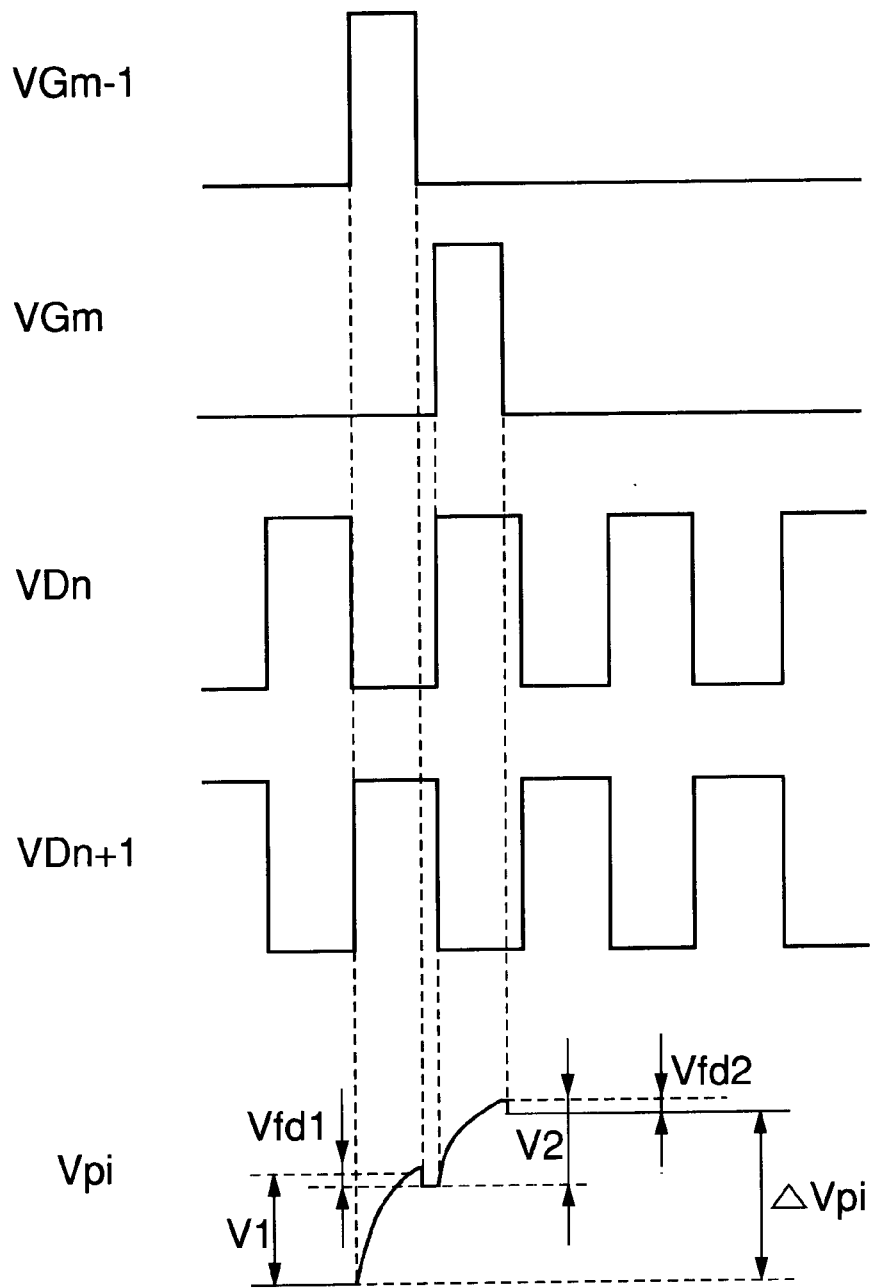
FIG. 5 is a graph showing a timing chart of a driving voltage and change of a pixel voltage with time in the case of adopting a drive method in the first embodiment of the TFT array of the present invention.
Figure 6:
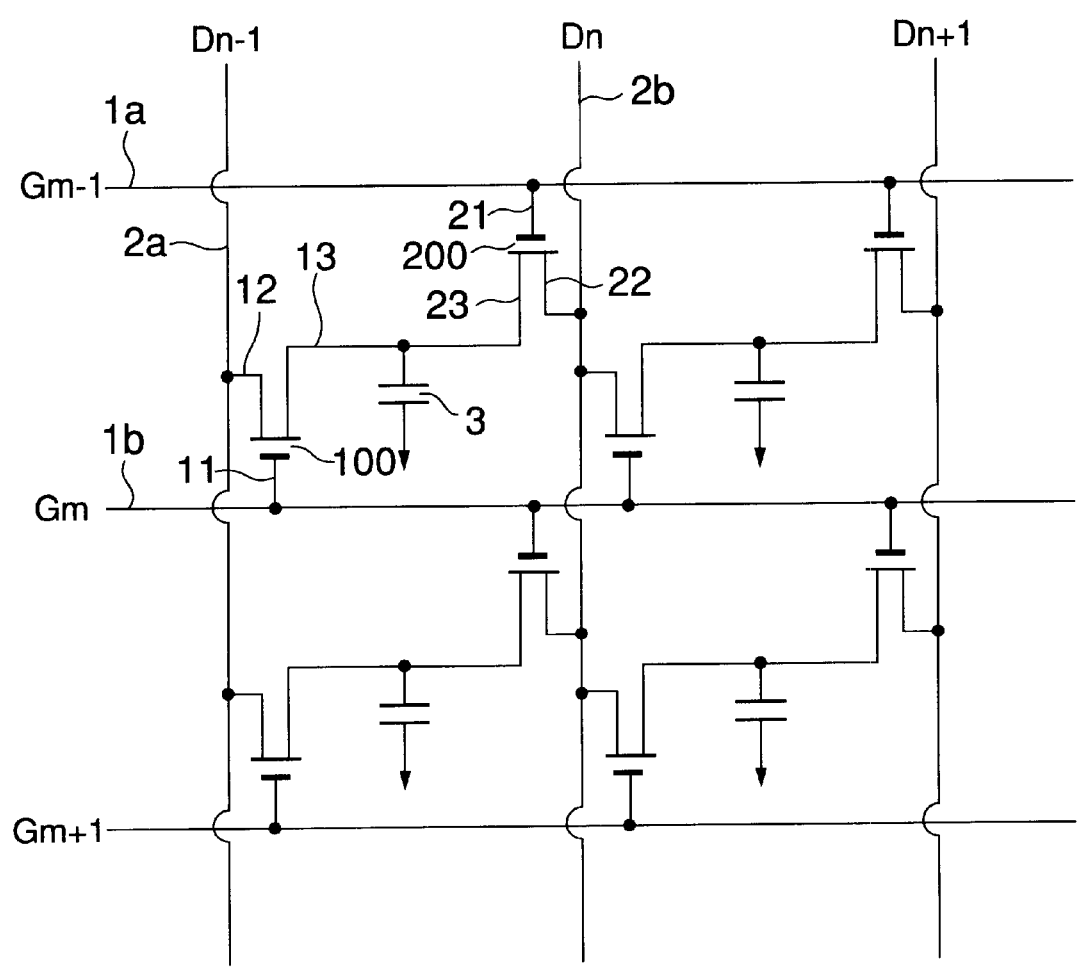
FIG. 6 is a block diagram showing a circuit configuration in the first embodiment of the TFT array of the present invention.

Next, a drive method in the first embodiment of the TFT array of the present invention will be described with reference to FIGS. 5 and 6. FIG. 5 is a graph showing a timing chart of a driving voltage and change of a pixel voltage with time in the drive method in the first embodiment of the TFT array of the present invention. FIG. 6 is a block diagram showing a circuit configuration in the first embodiment of the present invention. First, a gate voltage of the second TFT 200 for preliminary charging, namely a voltage V1a in the scanning line 1a turns to high voltage and the second TFT 200 for preliminary charging turns to ON state. Next, a data voltage of the second TFT 200, namely a data voltage V2a in the signal line 2a starts to be charged to the pixel electrode 3 and a pixel voltage Vp increases. Then, the gate voltage V1a turns to low and the second TFT 200 turns to OFF state and the pixel voltage Vp decreases by Vfd1.

On the other hand, a gate voltage of the first TFT 100 for writing, namely a voltage V1a in the scanning line 1b turns to high and the first TFT 100 turns to ON state.

As a result, a data voltage of the first TFT 100, namely a voltage V2b in the signal line 2b starts to be charged into the pixel electrode 3 and the pixel voltage Vp increases more.

Thereafter, the gate voltage V1a turns to low voltage and the first TFT 100 turns to OFF state and the pixel voltage Vp decreases by Vfd2.

By performing such a drive method of the TFT array in a dot reverse drive manner, in comparison with the case of using a TFT array in which only the first TFT 100 is installed, writing time to the pixel electrode 3 becomes about twice and the pixel electrode 3 can be fully charged.

(Second Embodiment)

Figure 7:
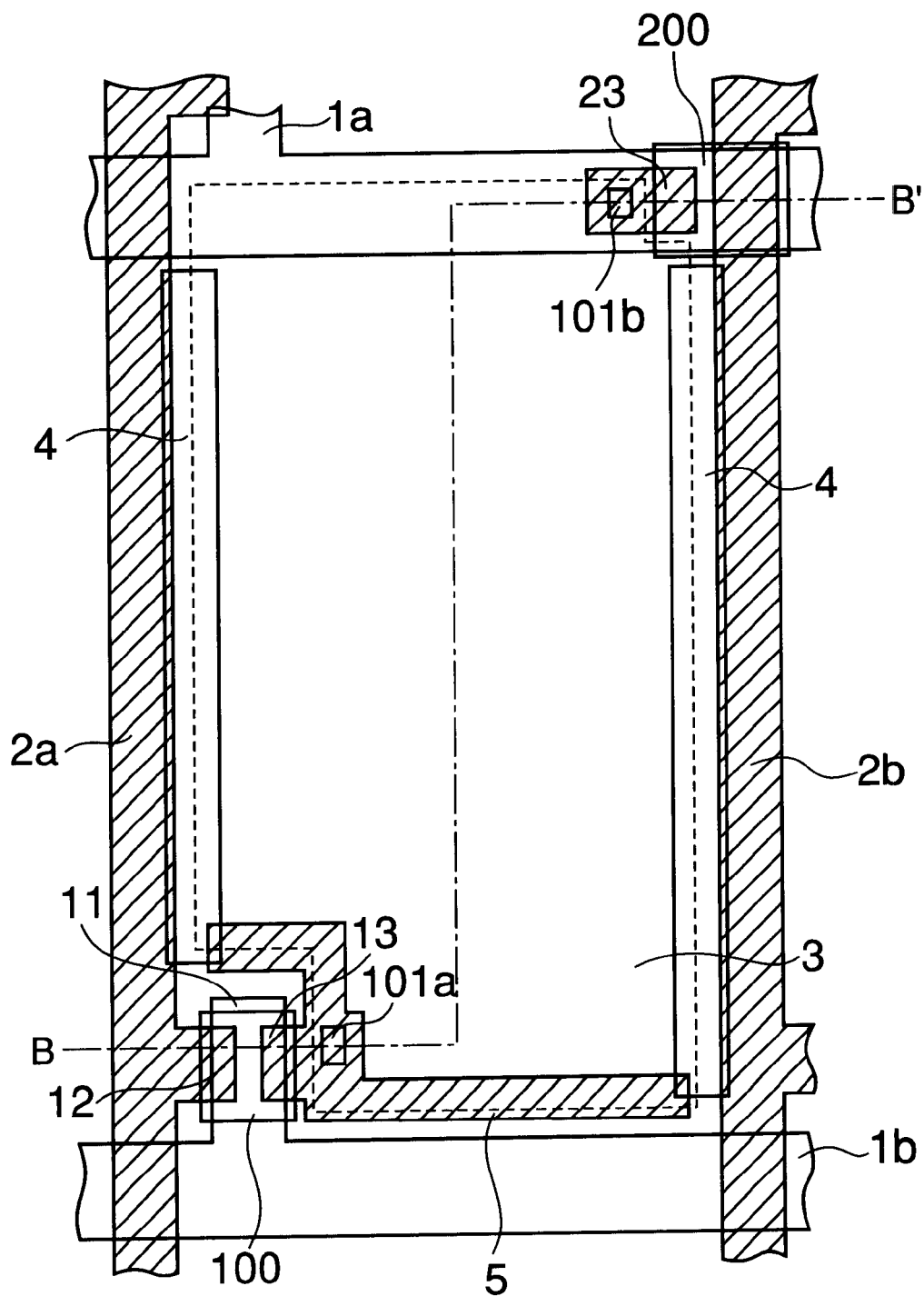
FIG. 7 is a plan view showing a second embodiment of a TFT array of the present invention.

Next, a second embodiment of the present invention will be described with reference to the accompanying drawings. But, in the second embodiment, a description of the same configuration and drive method as the first embodiment described above is omitted. FIG. 7 is a plan view showing a structure of the second embodiment of the present invention. As shown in FIG. 7, in the second embodiment of the present invention, contact holes electrically connected to a pixel electrode 3 extending through a passivation layer 6 formed on the surface of a first source electrode 13 of a first TFT 100 and the surface of a second source electrode 23 of a second TFT 200 are formed.

Figure 8:
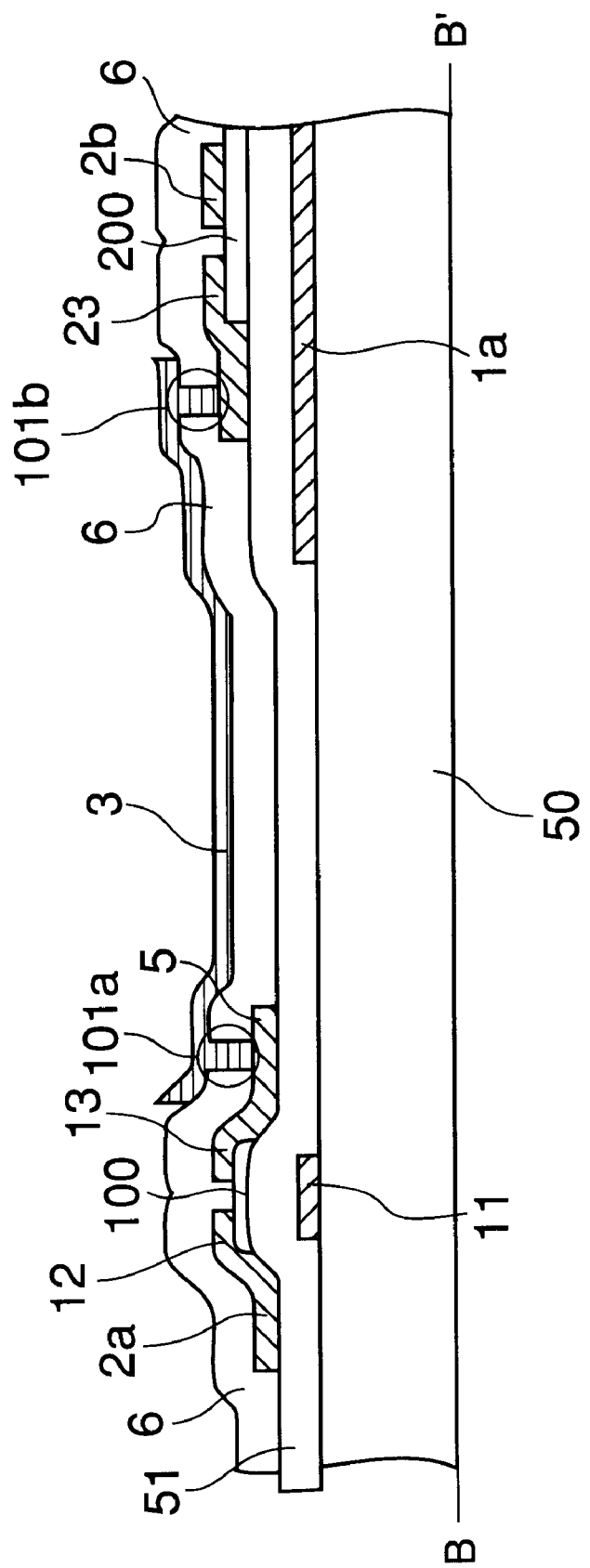
FIG. 8 is a sectional view showing a structure in the second embodiment of the TFT array of the present invention.

That is, as is evident from FIG. 8 showing a sectional view taken on line B—B' of FIG. 7, etching treatment to the passivation layer 6 is not performed when forming the passivation layer 6 and a contact hole 101a and a contact hole 101b are formed, and thereby the pixel electrode 3 is electrically connected to the first source electrode 13 and the second source electrode 23.

By adopting the structure shown in the second embodiment of the present invention, a formation step of the passivation layer 6 formed on the pixel electrode 3 conventionally can be eliminated, with the result that cost and labor involved in the step can be reduced.

(Third Embodiment)

Figure 9:
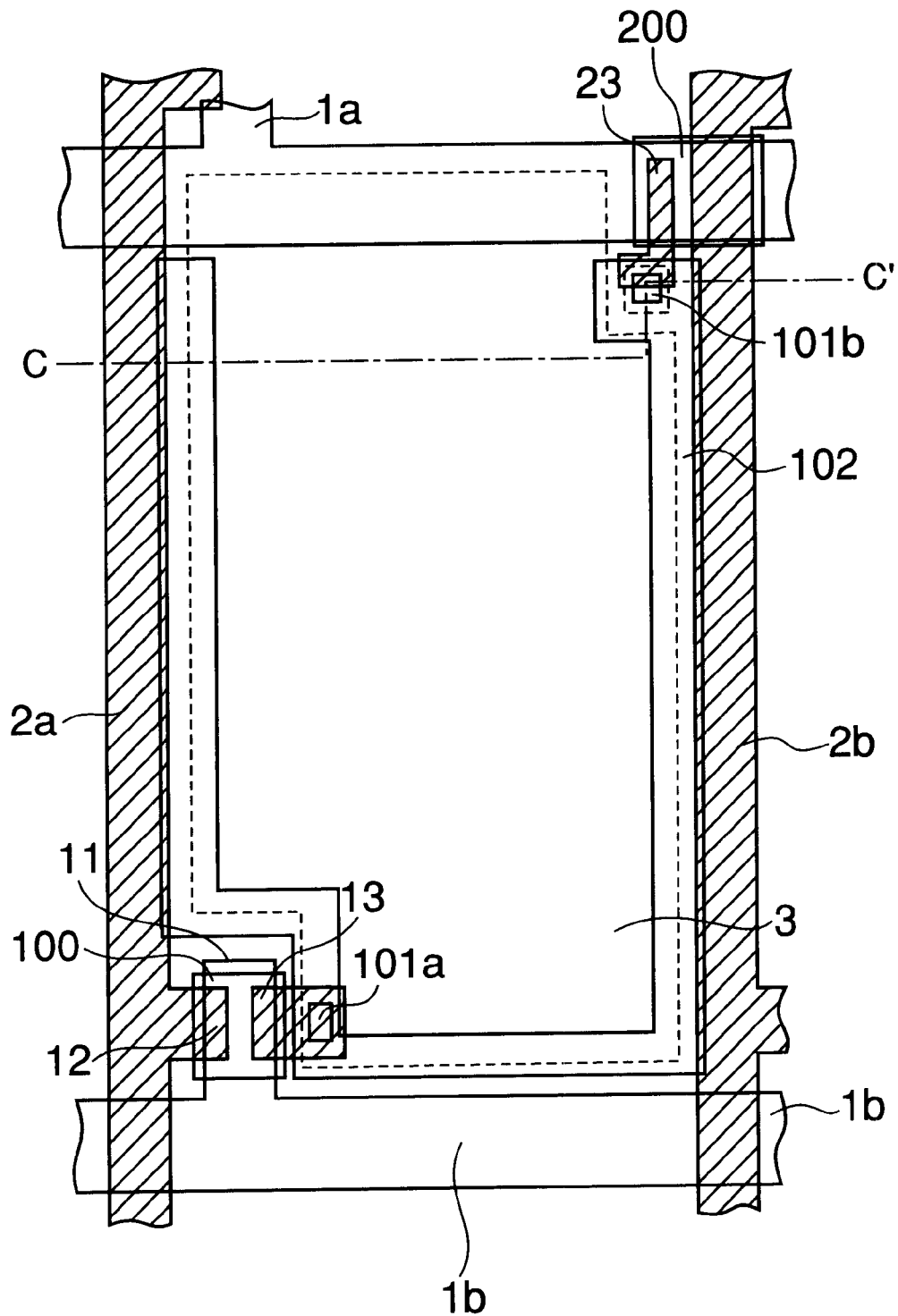
FIG. 9 is a plan view showing a third embodiment of a TFT array of the present invention.

Next, a third embodiment of the present invention will be described with reference to FIG. 9. But, in the second embodiment, a description of the same configuration and drive method as the first and second embodiments described above is omitted. As shown in FIG. 9, two first light shield layers 4 provided in the side of a pixel electrode of signal lines and a second light shield layer 5 provided in the side of the pixel electrode of a scanning line are integrally formed and their light shield layers are provided as a wiring side light shield layer 102 so as to be sandwiched between the pixel electrode 3 and the signal lines 2a, 2b.

Figure 10:
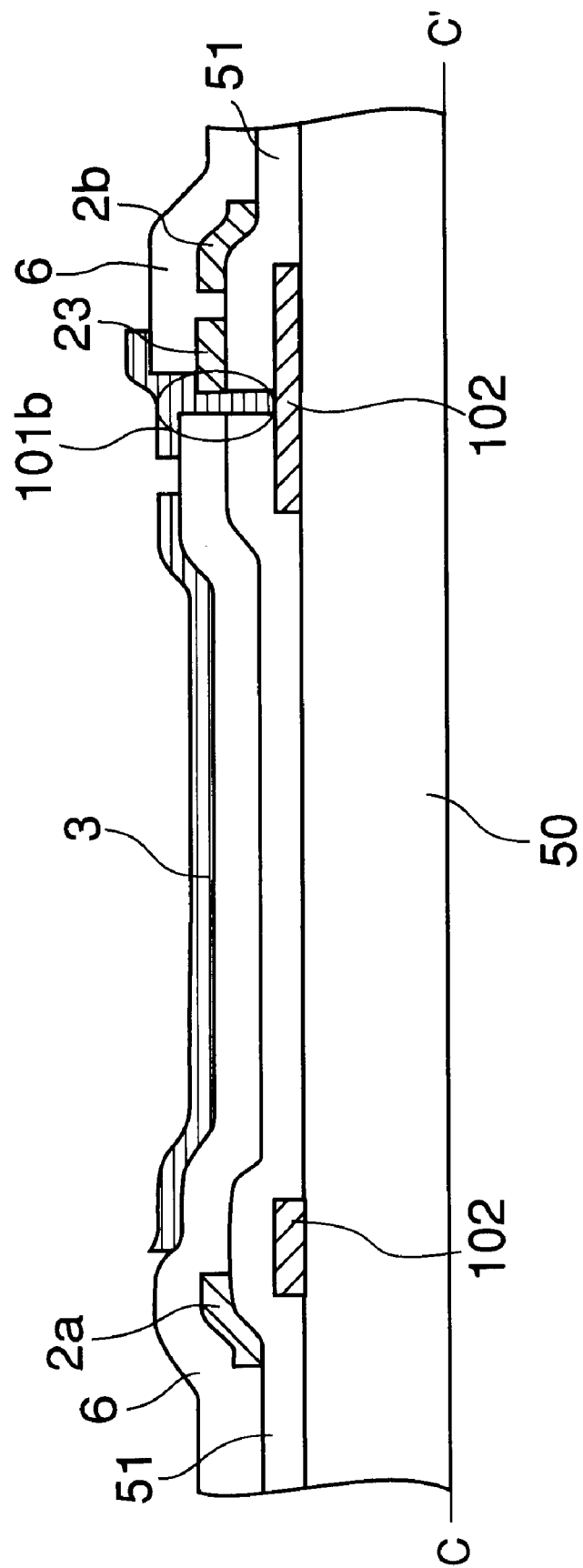
FIG. 10 is a sectional view showing a structure in the third embodiment of the TFT array of the present invention.

Referring to FIG. 10 showing a sectional view taken on line C—C' of FIG. 9, in a second source electrode 23 of a second TFT 200, a contact hole 101b is provided so as to be electrically connected to the wiring side light shield layer 102 extending through a passivation layer 6 and a gate insulating film 51.

Figure 11:
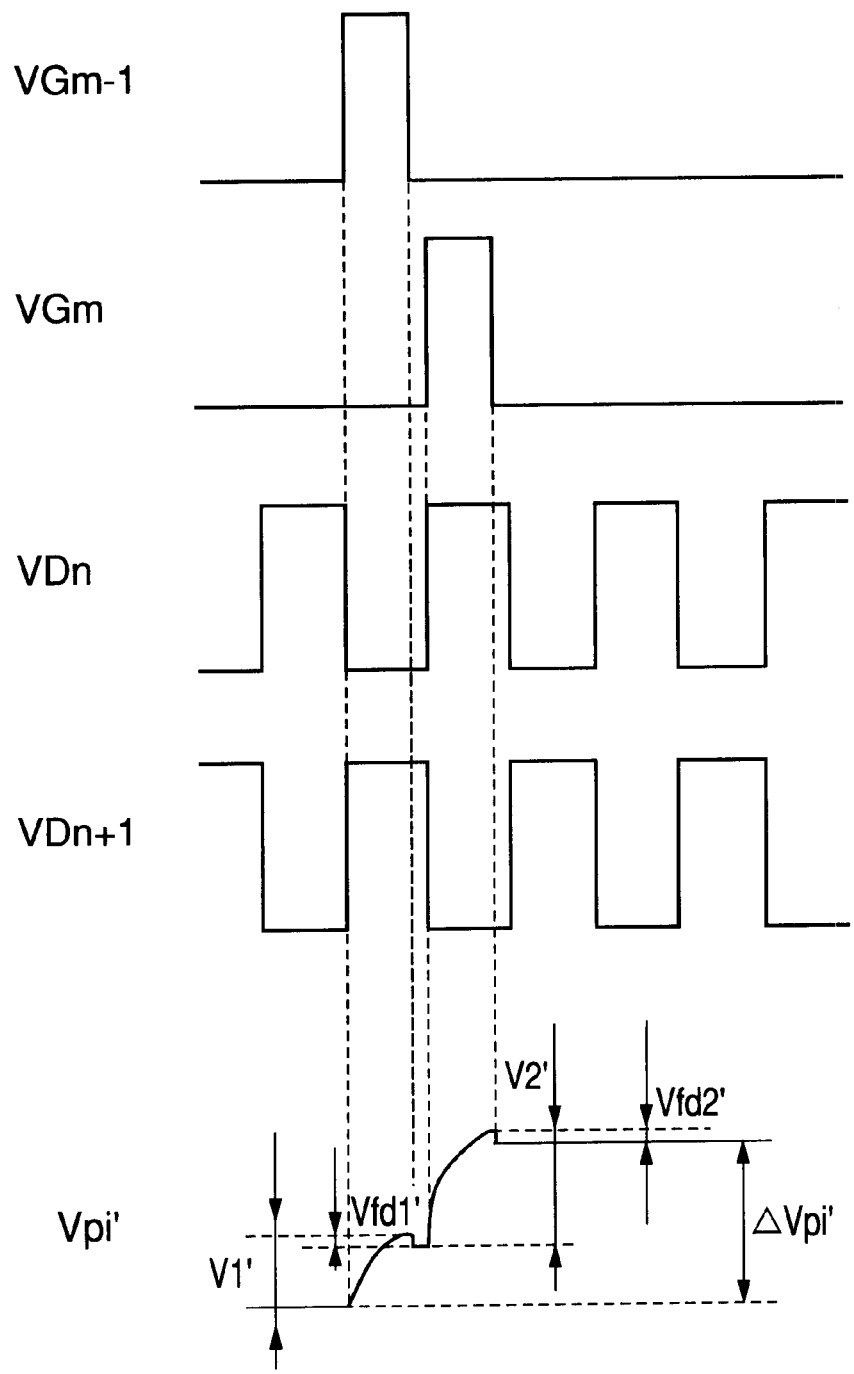
FIG. 11 is a graph showing a timing chart of a driving voltage and change of a pixel voltage with time in the case of adopting a drive method in the third embodiment of the TFT array of the present invention.

Then, a drive method in the third embodiment of the present invention will be described with reference to FIGS. 11. As shown in FIG. 11, first, a gate voltage V1a turns to high and the second TFT 200 turns to ON state.

Next, while a data voltage V2a is charged into the wiring side light shield layer 102, a pixel voltage Vp' increases through a parasitic capacitance occurring between the source electrode 23 of the second TFT 200 for preliminary charging and the pixel electrode 3.

Then, the gate voltage V1a turns to low and the second TFT 200 turns to OFF state and simultaneously the pixel voltage Vp' decreases by Vfd1'.

On the other hand, a gate voltage V1b turns to high and the first TFT 100 turns to ON state. As a result, a data voltage V2a starts to be charged into the pixel electrode 3 and the pixel voltage Vp' increases more. Thereafter, the gate voltage V1b turns to low and the first TFT 100 for writing turns to OFF state and simultaneously the pixel voltage Vp' decreases by Vfd2'.

Here, $V_1'$ increasing by charging the above-mentioned data voltage V2a into the wiring side light shield layer 102 is indicated by the following expression.

$$V_1' = \{C_{21}/(C_{21}+C_{19})\} \times Vsc$$

where $C_{21}$ is a parasitic capacitance occurring between the source electrode 23 of the second TFT 200 for preliminary charging and the pixel electrode 3 and $C_{19}$ is an additional capacitance and Vsc is a voltage charged into the wiring side light shield layer 102. By adopting such a structure, preliminary charging is performed into the pixel electrode 3 through the parasitic capacitance occurring between the source electrode 23 of the second TFT 200 and the pixel electrode 3, so that a decrease in pixel voltage due to leakage of the second TFT 200 for preliminary charging can be reduced.

According to a TFT array of the present invention, a formation position of a second TFT for preliminary charging does not occupy a pixel region and a large aperture ratio can be implemented.

What is claimed is:

1. A thin transistor (TFT) array comprising:
   an insulating substrate,
   a plurality of scanning lines and signal lines perpendicular one another provided on the insulating substrate,
   a plurality of pixel electrodes provided in pixel regions surrounded by the scanning lines and the signal lines, and
   a first thin film transistor (TFT) for supplying a voltage to one of the pixel electrodes and a second thin film transistor (TFT) for performing preliminary charging of the one of the pixel electrode before the first TFT supplies the voltage to the one of the pixel electrodes,
   wherein the second TFT is formed so as to overlap with a part of one of the scanning lines and a part of one of the signal lines.

2. A TFT array as defined in claim 1, wherein a second gate electrode of the second TFT is connected to a scanning line of the forward row of a scanning line connected to a first gate electrode of the first TFT.

3. A TFT array as defined in claim 1, wherein a scanning line connected to a second gate electrode of the second TFT is a scanning line of the forward row of a scanning line connected to a first gate electrode of the first TFT, and a signal line connected to a second drain electrode of the second TFT is a signal line of the next column of a signal line connected to a first drain electrode of the first TFT.

4. A TFT array as defined in claim 1, further comprising:
   a passivation layer formed so as to cover a first source electrode of the first TFT and a second source electrode of the second TFT, and
   a contact hole extending through the passivation layer, characterized in that the first and second source electrodes are connected to the pixel electrodes.

5. A TFT array as defined in claim 3, wherein a light shield layer formed inside the scanning lines and the light shield layer is connected to a second source electrode of the second TFT, and the light shield layer forms a storage capacitance between the second source electrode and the pixel electrode.

6. A semiconductor device comprising:
   an insulating substrate;
   a first scanning line disposed on said insulating substrate;
   a second scanning line disposed substantially parallel to said first scanning line;
   a first signal line disposed substantially perpendicular to said first scanning line;
   a second signal line disposed substantially parallel to said first signal line;
   a pixel electrode disposed in a region surrounded by said first scanning line, said second scanning line, said first signal line, and said second signal line;
   a first transistor for supplying a first voltage to said pixel electrode, comprising:
      a first gate electrode connected to said second scanning line; and
      a first drain electrode connected to said first signal line; and
   a second transistor for supplying a second voltage to said pixel electrode, comprising:
      a second gate electrode connected to said first scanning line; and
      a second drain electrode connected to said second signal line, and
   wherein said second transistor is disposed so as to overlap with said first scanning line.

7. The semiconductor device as claimed in claim 6, wherein said second transistor is disposed so as to overlap with said second signal line.

8. The semiconductor device as claimed in claim 6, wherein said first scanning line is activated to change a first potential at said pixel electrode into a second potential corresponding to said first voltage of said first signal line, and then said second scanning line is activated to change said second potential at said pixel electrode into a third potential corresponding to said second voltage of said second signal line.

9. The semiconductor device as claimed in claim 8, wherein said first transistor further comprises:
   a first source electrode connected to said pixel electrode; and
   a first semiconductor layer disposed between said first drain electrode and said first source electrode, and
   wherein said second transistor further comprises:
      a second source electrode; and
      a second semiconductor layer disposed between said second drain electrode and said second source electrode.

10. The semiconductor device as claimed in claim 9, wherein said second semiconductor layer disposed to overlap with said first scanning line.

11. The semiconductor device as claimed in claim 10, wherein said second source electrode is electrically connected to said pixel electrode.

12. The semiconductor device as claimed in claim 11, further comprising:
   a first insulating layer disposed on said first scanning line;
   a second insulating layer disposed on said first signal line and said second signal line.

13. The semiconductor device as claimed in claim 12, wherein said pixel electrode is disposed on said first source electrode and said second source electrode, and
   wherein said second insulating layer is disposed on at least a part of said pixel electrode.

14. The semiconductor device as claimed in claim 12, wherein said second insulating layer is disposed on said first source electrode and said second source electrode, and further comprising:
   a first contact plug connecting said first source electrode to said pixel electrode; and
   a second contact plug connecting said second source electrode to said pixel electrode.

15. The semiconductor device as claimed in claim 10, further comprising:
   a shield layer disposed between said pixel electrode and said second signal electrode.

16. The semiconductor device as claimed in claim 15, wherein said second source electrode is connected to said shield layer.

17. The semiconductor device as claimed in claim 15, further comprising:
   a first insulating layer disposed on said first scanning line;
   a second insulating layer disposed on said first source electrode and said second source electrode;
   a contact plug connecting said second shield layer and said second source electrode.

18. The semiconductor device as claimed in claim 17, wherein said first scanning line is activated to change said first potential at said pixel electrode into said second potential by using a capacitance comprising said shield layer and said first insulating layer and said second insulating layer.

* * * * *